Patented Mar. 13, 1951

2,545,057

UNITED STATES PATENT OFFICE 2,545,057

DIAZOTYPES CONTAINING RESORCINOL SULFONIC ACIDS AS COUPLING COMPONENTS

William H. von Glahn and Lester N. Stanley, Albany, N. Y., assignors to General Aniline & Film Corporation, New York, N. Y., a corporation of Delaware No Drawing. Application June 12, 1946, Serial No. 676,362

6 Claims. (Cl. 95—6)

The present invention relates to two-component light-sensitive diazotype materials and particularly to the azo component utilized therein.

The two-component diazotype process involves the sensitization of a base such as paper or the like with a composition containing a light-sensitive diazo compound and an azo component capable of coupling in an alkaline medium with the diazo component, exposing the sensitized base through a pattern and developing the exposed material by means of an alkali, preferably ammonia vapors.

This process, which is of rather general application for the formation of prints from original patterns, has become increasingly more important in the preparation of transition prints or intermediate prints on a transparent base stock for the purpose of reproducing drawings, originals of old manuscripts and the like. The efficiency of these prints depends on two factors, to wit, the opacity to ultraviolet light of the azo dye of which the image is formed, and the transparency of the background of the print. Up to the present the coupling components used in sensitized diazotype materials for the manufacture of transition prints are those which give sepia toned images. Quite generally it has been the practice to select resorcinol as such coupling component primarily because the azo dye images obtained when utilizing resorcinol have good opacity to ultraviolet light. In addition, resorcinol has other valuable characteristics in the diazotype process such as its solubility in aqueous sensitizing solutions, the intensity of the images produced therefrom, the speed at which it couples and the like.

However, this compound has at least one outstanding objection when used in the two-component diazotype materials and that is its low precoupling stability. Due to this property of resorcinol when it is used with a diazo for the sensitization of a base for the production of diazotypes, the sensitized base may gradually develop a yellow background, as a consequence of which the transparency of the background is materially diminished. While this is objectionable in the manufacture of diazo prints in general because of the loss of contrast, it is particularly objectionable where the light-sensitive diazo is employed for the manufacture of the intermediate or transition prints since manifestly the darkening of the background impairs the efficiency of such prints.

We have now discovered that the disadvantages inherent in the use of resorcinol as an azo coupling component in two-component diazotype materials in general and in such materials when used for the preparation of transition or intermediate prints in particular are avoided while utilizing a sulfonated resorcinol as the coupling component rather than resorcinol per se. Not only do the sulfonated resorcinols have the desirable properties of resorcinol, but they have such properties even to a greater extent than resorcinol and this is particularly true as regards the opacity of the intermediate prints obtained therefrom to ultraviolet light when selected diazos are used for forming the dyestuff images.

It is accordingly an object of the present invention to provide light-sensitive diazotype materials capable of yielding sepia toned transition or intermediate prints having an unstained or uncolored background.

It is a further object of the present invention to provide two-component diazo-type light-sensitive materials which are stable against precoupling even after storage for long periods of time.

It is a further object of the present invention to provide two-component diazotype light-sensitive materials containing a sulfonated resorcinol as the azo coupling component.

A further object of the present invention is a process which involves sensitizing a base with a light-sensitive diazo compound and a sulfonated resorcinol and after exposing the light-sensitive material through a pattern, developing the same with an alkali.

Other and further important objects will become apparent as the description proceeds.

The sulfonated resorcinols the utilization of which in two-component diazotype papers is contemplated herein may be formulistically represented as follows:

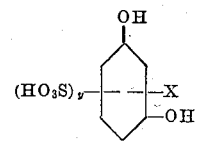

in which $y$ is 1 or 2 and X is a member of the class consisting of hydrogen, alkyl such as methyl, ethyl, propyl, butyl, amyl or the like, or halogen such as chlorine, bromine and the like. Such compounds may be utilized as such or in the form of their water-soluble salts such as the ammonium or alkali metal salts, i. e., sodium, potassium and the like.

Examples of compounds within the above category which have been found to be suitable are:

1.3-dihydroxybenzene-4.6-disulfonic acid or the di-sodium salt thereof.

1.3-dihydroxybenzene-4-sulfonic acid and its water-soluble salts, e. g., its ammonium salt.

1.3-dihydroxy-6-chlorobenzene-4-sulfonic acid and its water-soluble salts, e. g., its sodium salt.

1.3-dihydroxy-2-bromobenzene-4.6 - disulfonic acid and the di-sodium salt thereof.

1.3 - dihydroxy-6-methyl-benzene - 4 - sulfonic acid and its ammonium salt.

1.3-dihydroxybenzene-5-sulfonic acid and its sodium salt.

The resorcinol monosulfonic acids excepting the resorcinol 5-sulfonic acid are prepared by reacting resorcinol with the theoretical quantity of 100 per cent sulfuric acid. The resorcinol 5-sulfonic acid, on the other hand, is made by the method described in Beilstein, volume 11, page 298.

The resorcinol disulfonic acids may be prepared by heating the resorcinol parent material with fuming sulfuric acid to water bath temperatures (see Beilstein, volume 6, page 799).

The aforementioned azo coupling components are employed with the diazo compounds usually employed in the two-component diazotype art such as the aromatic diazonium compounds in stabilized form, i. e., their double salts with cadmium chloride, tin chloride, zinc chloride, borofluoride and the like, or their alkyl- or aryl-sulfonates or their acid sulfates or anhydrides. Examples of suitable compounds are the stabilized diazonium compounds from:

5-amino-2-monoethylaminotoluene
1-diethylamino-3-ethoxy-4-aminobenzene
1-dimethylamino-3-methoxy-4-aminobenzene
1-(N-ethyl-N-propylamino)-3-ethoxy-4-aminobenzene
1-(N-ethyl-N-butylamino)-3-methoxy-4-aminobenzene
p-Aminodiphenylamine
1-(N-ethyl-N-hydroxyethylamino)-4-aminobenzene
1-benzoylamino-2,5-diethoxy-4-aminobenzene
1-diethylamino-4-aminobenzene
1-(N-ethyl-N-benzylamino)-4-aminobenzene
1-(2',6'-dichlorobenzylamino)-4-aminobenzene
1-(2',6'-dichlorobenzylamino)-2-phenoxy-4-aminobenzene
1-dimethylamino-4-aminobenzene
1-dimethylamino-3-methyl-4-aminobenzene
p-Aminophenylmorpholine
1-(N-hydroxyethyl-N-methylamino)-4-aminobenzene
2-amino-1-naphthol-5-sulfonic acid The sensitizing compositions may also have present therein the adjuncts found to be suitable to give the best form of two-component diazotype light-sensitive materials. These adjuncts include metal salts for intensifying the dyestuff image such as aluminum sulfate, titanium ammonium fluoride, nickel sulfate and the like; stabilizing agents such as thiourea, thiosinamine, naphthalene trisulfonic acid and its salts and the like; restrainers against precoupling involving acids such as citric, tartaric, boric and the like, and hygroscopic agents such as glycol, glycerine, dextrine and the like. Inasmuch as the use of these adjuncts is well known in the art, further information with respect thereto is believed to be unnecessary.

The base to which the sensitizing compositions are applied may be a sheet, film or web of any of the usual film forming materials such as paper, regenerated cellulose, cellulose ethers such as cellulose ethylether, cellulose esters, such as cellulose acetate, cellulose propionate, cellulose butyrate and the like, linear superpolymers such as linear superpolyamides, linear super polyesters, linear superpolyethers, linear superpolyureas, linear superpolyurethanes and the like.

Due to the presence in the coupling component of such water-solubilizing groups as the hydroxyl and sulfonic acid groups the sensitizing compositions may be applied from an aqueous solution. This has the advantage of avoiding the utilization of solvents which always render the coating or impregnation of the base a more costly procedure.

It might be noted here that the findings with respect to applicants' compounds are rather surprising in view of the experience encountered when using other derivatives of resorcinol. As a general rule, such other derivatives have disadvantages which preclude their adoption as azo coupling components for this art. For instance, the nitro-resorcinols are colored compounds and accordingly produce light-sensitive materials with an objectionable background. The alkyl-resorcinols, on the other hand, produce light-sensitive materials of very poor stability.

U. S. P. 2,196,950 suggests the use as azo coupling components of dihydroxynaphthalenes. It is stated in this patent, however, that the employment of such compounds containing a sulfo group as a substituent should be avoided due to the fact that prints obtained with such derivatives do not have satisfactory water fastness. Due to the similarity of resorcinol and the dihydroxy-naphthalenes, it would be assumed that the findings of the patentee with respect to the sulfonated dihydroxynaphthalenes would likewise apply to the resorcinols. The discovery described herein since it is contrary to the findings of the patentee is therefore inexplicable. In any case, it will be apparent from what has been said that the particular resorcinols lead to a result which is contrary to what would have been expected from the knowledge gained by experimentation with other compounds of a somewhat related nature.

The invention is further illustrated by the accompanying examples, but it is to be understood that it is not restricted thereto.

*Example I*

45 parts of the double salt of zinc chloride and the diazo of p-(N-methyl-N-beta-hydroxyethyl)-aminoaniline,
40 parts of boric acid,
50 parts of zinc chloride,
40 parts of citric acid,
50 parts of thiourea,
50 parts of ethylene glycol,
20 parts of isopropyl alcohol,
5 parts of saponin, and
94 parts of 1.3-dihydroxybenzene-4.6-disulfonic acid are dissolved in sufficient water to make one liter of solution. The resulting sensitizing composition is applied to paper and the paper dried. The sensitized paper thus obtained is far more stable than that produced when using resorcinol as the coupler.

Upon exposing the paper through a pattern and developing the same with ammonia vapor in the usual developing machines, dye prints are obtained which have excellent dye intensity.

*Example II*

The procedure is the same as in Example I excepting that the coupler employed is 1.3-dihydroxybenzene-4-sulfonic acid. The sensitized paper has excellent stability against precoupling. Upon exposing and developing the paper as in Example I, dye prints having exceptional opacity to ultraviolet light and excellent dye intensity are obtained.

*Example III*

25 parts of the double salt of zinc chloride and the diazo compound of 5-amino-2-ethylamino-1-toluene 5 parts of 1.3-dihydroxy-6-chlorobenzene-4-sulfonic acid
60 parts of tartaric acid
25 parts of citric acid
50 parts of an aluminum sulfate
40 parts of thiourea are dissolved in a liter of water. Paper is impregnated with this composition to produce a light-sensitive diazotype material. These papers have far better keeping qualities than those made with resorcinol as the coupler.

*Example IV*

10 parts of the di-sodium salt of 1.3-dihydroxy-2-bromo-benzene-4.6-disulfonic acid
9.3 parts of zinc chloride double salt of the diazo compound from para-diethylaminoaniline
30 parts of tartaric acid
40 parts of boric acid
50 parts of thiourea
40 parts of naphthalene trisulfonic acid, and
5 parts of ammonium sulfate are dissolved in a liter of water and the resulting solution used to impregnate paper. The paper thus obtained possesses excellent keeping qualities in the sensitized state.

The dyes obtained upon exposing the paper through a pattern and developing the same with ammonia give prints of good density.

*Example V*

20 parts of the double salt of zinc chloride and the diazo of p-(N-methyl-N-β-hydroxyethyl)-aminoaniline
2 parts of the sodium salt of 1.3-dihydroxybenzene-4-sulfonic acid
60 parts of tartaric acid
40 parts of boric acid
40 parts of thiourea
20 parts of naphthalene trisulfonic acid
30 parts of ammonium sulfate are dissolved in a liter of water. The resulting composition is used to treat paper, after which the paper is dried. The keeping qualities of the paper are markedly better than the same paper obtained while using resorcinol as the coupler.

*Example VI*

50 parts of the double salt of zinc chloride and the diazo of 4-(p-aminophenyl)-morpholine
40 parts of boric acid
50 parts of zinc chloride
40 parts of citric acid
50 parts of thiourea
50 parts of ethylene glycol
20 parts of isopropyl alcohol
5 parts of saponin
57 parts of 1,3-dihydroxybenzene-4-sulfonic acid are dissolved in sufficient water to make one liter of solution. The resulting sensitizing composition is applied to transparentized paper and the paper dried.

The sensitized paper thus obtained after exposure under an image and development with ammonia vapor in the usual developing machine produces a sepia print which is opaque to ultraviolet light under the dye areas and possesses excellent line density.

*Example VII*

26 parts of the double salt of zinc chloride and p-diethylaminoaniline diazonium chloride 26 parts of 1,3-dihydroxybenzene-4-sulfonic acid
80 parts of citric acid
40 parts of thiourea
5 parts of saponin.

are dissolved in 1000 cc. of water. Transparentized paper is impregnated with this composition to produce a light-sensitive diazotype material. These papers are much more stable to precoupling on storage than similar ones made using the unsulfonated resorcinol. When exposed under a positive image followed by development with ammonia vapor, they form dark sepia positives which have good visual appearance, and a high degree of opacity against a transparent background. These prints are used as original positives over ordinary diazotype papers to form prints of any desired shade.

We claim:

1. Light sensitive diazotype materials containing a light-sensitive diazo compound of a p-phenylenediamine and an azo dye coupler of the following formula:

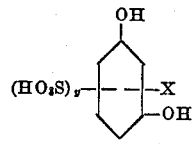

wherein $y$ is a member selected from the class consisting of 1 and 2 and X is a member selected from the class consisting of hydrogen, alkyl and halogen and wherein at least one free coupling position remains unsubstituted.

2. Light-sensitive diazotype materials containing a light-sensitive diazo compound and as an azo dye coupling component 1.3-dihydroxy-6-chlorobenzene-4-sulfonic acid.

3. Light-sensitive diazotype materials containing a light-sensitive diazo compound and as the azo coupling component 1.3-dihydroxybenzene-4-sulfonic acid.

4. The article defined in claim 3 wherein the light-sensitive diazo compound is the zinc chloride double salt of diazotized 4-(p-aminophenyl)-morpholine.

5. Light-sensitive diazotype materials containing a light-sensitive diazo compound and as the azo coupling component 1,3-dihydroxybenzene-5-sulfonic acid.

6. The light-sensitive material as defined in claim 1 wherein $y$ is 1 and X is halogen.

WILLIAM H. von GLAHN.
LESTER N. STANLEY.

REFERENCES CITED

The following references are of record in the file of this patent:

UNITED STATES PATENTS

| Number | Name | Date |
|---|---|---|
| 1,628,279 | Schmidt et al. | May 10, 1927 |
| 1,756,400 | Schmidt et al. | Apr. 29, 1930 |
| 1,807,761 | Sprongerts | June 2, 1931 |
| 2,245,628 | Poser | June 17, 1941 |
| 2,246,425 | Schmidt | June 17, 1941 |
| 2,298,444 | Weissberger | Oct. 13, 1942 |
| 2,416,773 | Reichel | Mar. 4, 1947 |

FOREIGN PATENTS

| Number | Country | Date |
|---|---|---|
| 7,453 of 1890 | Great Britain | Apr. 18, 1891 |